(12) United States Patent
Lewine et al.

(10) Patent No.: US 8,977,825 B1
(45) Date of Patent: Mar. 10, 2015

(54) TECHNIQUES FOR ABSTRACT PROFILE DEFINITION TO SUPPORT INFORMATION HIDING

(75) Inventors: Eric Scott Lewine, Apex, NC (US); Neil Schutzman, Marlborough, MA (US); Scott D. Von Rhee, Boston, MA (US); Sriram Krishnan, Shrewsbury, MA (US); Mario Wurzl, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 357 days.

(21) Appl. No.: 13/435,907

(22) Filed: Mar. 30, 2012

(51) Int. Cl.
  *G06F 12/00* (2006.01)
  *G06F 13/00* (2006.01)
  *G06F 13/28* (2006.01)

(52) U.S. Cl.
  USPC .......................................................... 711/156

(58) Field of Classification Search
  USPC .......................................................... 711/156
  See application file for complete search history.

(56) References Cited

U.S. PATENT DOCUMENTS

| | | | |
|---|---|---|---|
| 7,065,616 B2 * | 6/2006 | Gajjar et al. | 711/154 |
| 7,363,390 B2 * | 4/2008 | Quinn et al. | 710/5 |
| 8,131,743 B1 | 3/2012 | Joyce et al. | |
| 8,280,930 B1 | 10/2012 | Wei et al. | |
| 8,326,882 B1 | 12/2012 | Desai et al. | |
| 2005/0216481 A1 * | 9/2005 | Crowther et al. | 707/100 |
| 2006/0161753 A1 * | 7/2006 | Aschoff et al. | 711/170 |
| 2007/0180168 A1 * | 8/2007 | Chikusa et al. | 710/74 |
| 2008/0147973 A1 * | 6/2008 | Gruttadauria et al. | 711/114 |
| 2012/0017043 A1 * | 1/2012 | Aizman et al. | 711/114 |

OTHER PUBLICATIONS

Duncan Epping, "What's New in VMWare vSphere 5.0—Storage", VMWare, 2011.*

* cited by examiner

*Primary Examiner* — Matthew Bradley
*Assistant Examiner* — Rocio Del Mar Perez-Velez
(74) *Attorney, Agent, or Firm* — BainwoodHuang

(57) ABSTRACT

A method performed by a storage management computer includes (a) receiving a set of storage profile definitions (SPDs) from an administrator of a data storage system over a user interface, each SPD of the set of SPDs including (1) a storage profile name and (2) a set of storage policies assigned to that SPD, (b) providing the storage profile names from the set of SPDs to an environment management application, the environment management application being configured to manage environments that use storage from the data storage system, (c) in response to providing, receiving a selection of a particular SPD from the environment management application to be used in connection with a particular environment, and (d) provisioning a unit of storage from the data storage system to the particular environment in accordance with the set of storage policies assigned to the particular SPD.

18 Claims, 7 Drawing Sheets

TECHNIQUES FOR ABSTRACT PROFILE DEFINITION TO SUPPORT INFORMATION HIDING

BACKGROUND

Data storage systems may be used to provide data storage to virtualization servers, which provide virtual environments to clients. Since different clients may wish to utilize different storage services, and since some clients may also wish to utilize different storage options across their various virtual environments, data storage systems may be configured to advertise their capabilities, to allow clients to select particular storage options for particular virtual machines.

SUMMARY

Although the above-described conventional systems provide beneficial functionality, it would be desirable to create pre-defined tiers of service and to hide implementation details from the clients.

Therefore, the present disclosure provides techniques for allowing a storage administrator to create custom storage profiles having specified policies and properties, and allowing a virtual environment administrator to select a storage profile for storage to be provisioned for a particular virtual machine or virtualized application. In some embodiments, the specified properties remain hidden from the virtual environment administrator.

In one embodiment, a method performed by a storage management computer is disclosed. The method includes (a) receiving a set of storage profile definitions from an administrator of a data storage system over a user interface, each storage profile definition of the set of storage profile definitions including (1) a storage profile name and (2) a set of storage policies assigned to that storage profile definition, (b) providing the storage profile names from the set of storage profile definitions to an environment management application, the environment management application being configured to manage environments that use storage from the data storage system, (c) in response to providing, receiving a selection of a particular storage profile definition from the environment management application to be used in connection with a particular environment, and (d) provisioning a unit of storage from the data storage system to the particular environment in accordance with the set of storage policies assigned to the particular storage profile definition. A corresponding apparatus and computer program product are also disclosed.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

The present disclosure provides techniques for allowing a storage administrator to create custom storage profiles having specified policies and properties, and allowing a virtual environment administrator to select a storage profile for storage to be provisioned for a particular virtual machine or virtualized application. In some embodiments, the specified properties remain hidden from the virtual environment administrator.

Figure 1:
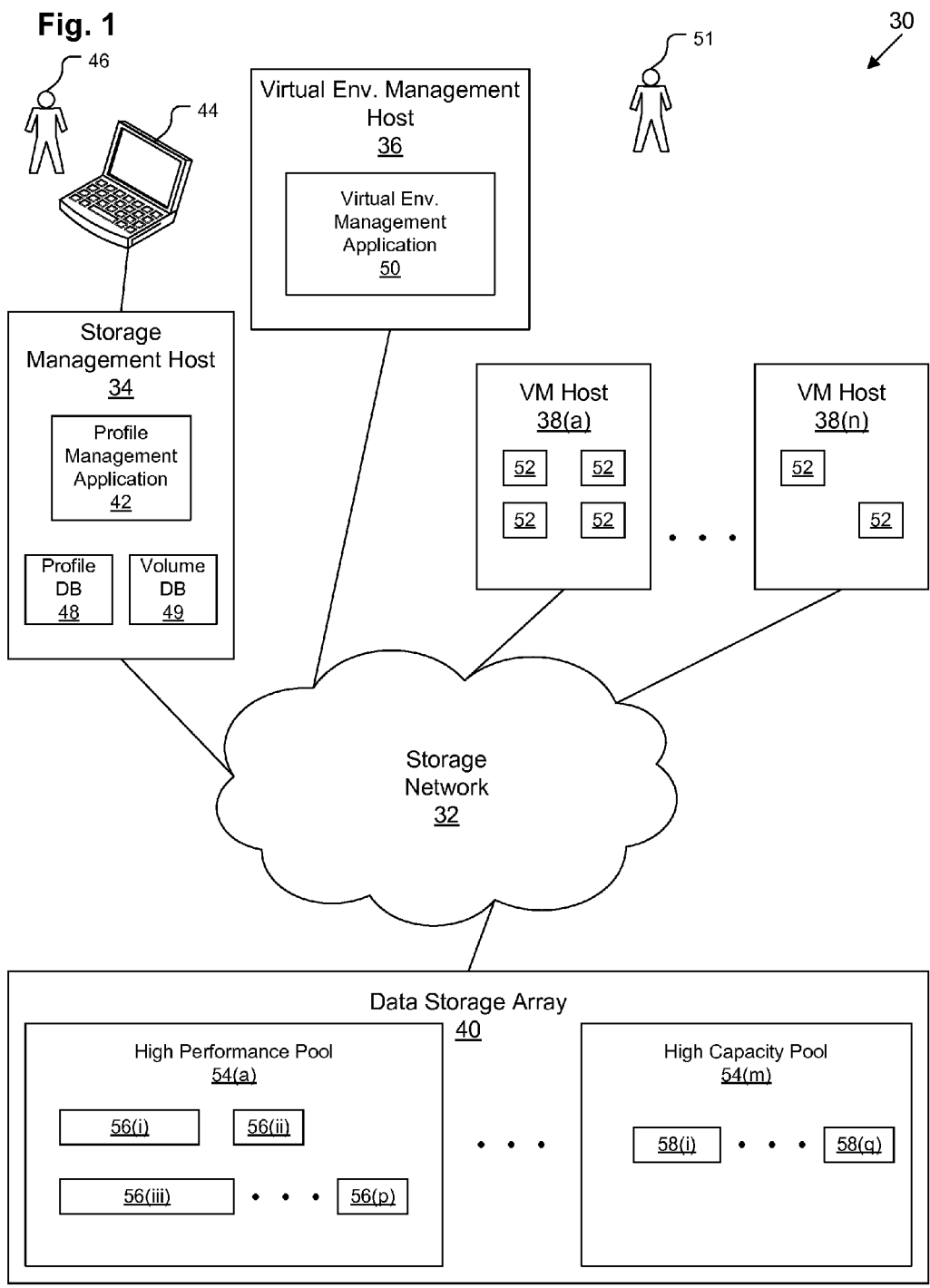
FIG. 1 illustrates an example system for use in practicing various embodiments.

FIG. 1 depicts an example system 30 for use in conjunction with various embodiments. System 30 includes a storage network 32 which connects to a storage management host 34, a virtual environment management host 34, a set of virtual machine (VM) hosts 38, and a data storage array 40. Storage network 32 may be a storage area network (SAN) configured to allow block-level access to storage on the data storage array 40, or it may be a local area network, wide area network, etc. to allow file-level access to storage on the data storage array 40. Storage management host 34, virtual environment management host 34, and the set of VM hosts 38 may be any kind of computerized devices, but they are typically enterprise server computers.

Storage management host 34 runs a profile management application 42, which receives input, via user interface (UI) devices 44 from a storage system administrator 46. UI devices 44 may include, for example, one or more of a display monitor, a touch-sensitive display device, a keyboard, a keypad, a mouse, a tracking pad, a tracking ball, etc. Profile management application 42 also maintains a profile database (DB) 48, which stores information about storage profiles, and a volume DB 49, which stores information about volumes of storage assigned to VM sessions 52, hosted by the VM hosts 38.

Virtual environment management host 36 runs a virtual environment management application 50, which manages the VM sessions 52 running on the various VM hosts 38. In some embodiments, virtual environment management application 50 runs on one of the VM hosts 38 instead of running on a separate server 36.

In a more generalized embodiment, an environment management host replaces the virtual environment management host 36, the environment management host managing a set of computing environments via an environment management application, replacing virtual environment management application 50. In some embodiments, as depicted, these computing environments may be VM sessions 52 running on VM hosts 38. In other embodiments, these environments may be actual machines, such as servers, workstations, personal computers, etc. In other embodiments, these environments may be a combination of VM sessions 52 running on VM hosts 38 as well as actual machines, such as servers, workstations, personal computers, etc. In some embodiments, environment management application may execute on the storage management host 34. In any event, whether the environments are actual or virtual, each environment may utilize storage on data storage array, as explained below. It should be understood that, although the Description mentions VM sessions 52, this is by way of example only—actual machine environments are included as well.

VM hosts 38 are powerful server machines capable of hosting several VMs. In one embodiment, VM hosts 38 may run, for example, VMware ESX™ virtualization software provided by the EMC Corp. of Hopkinton, Mass.

Data storage array 40 includes a large amount of storage, e.g., disk-based storage or solid state storage. In one embodiment, data storage array 40 may be, for example, a VNX® brand array produced by the EMC Corp. Data storage array 40 may include multiple pools 54(a), . . . 54(m). Each pool 54 may feature storage devices having different specifications. For example, high performance pool 54(a) may feature drives having very high performance, such as, for example, 15,000 RPM 600 GB serial attached SCSI (SAS) drives or 512 GB enterprise flash drives (EFDs), while high capacity pool 54(m) may feature drives having very high capacity (but perhaps lower performance), such as, for example, 7,200 RPM 2 TB near-line SAS (NL-SAS) drives. Each pool 54 may include a set of logical volumes 56, 58 (e.g., logical units if storage network 32 is a SAN or filesystems if storage network 32 is a LAN) allocated to various VM sessions 52. It will be apparent that the various logical volumes 56, 58 may be of different sizes.

Figure 2:
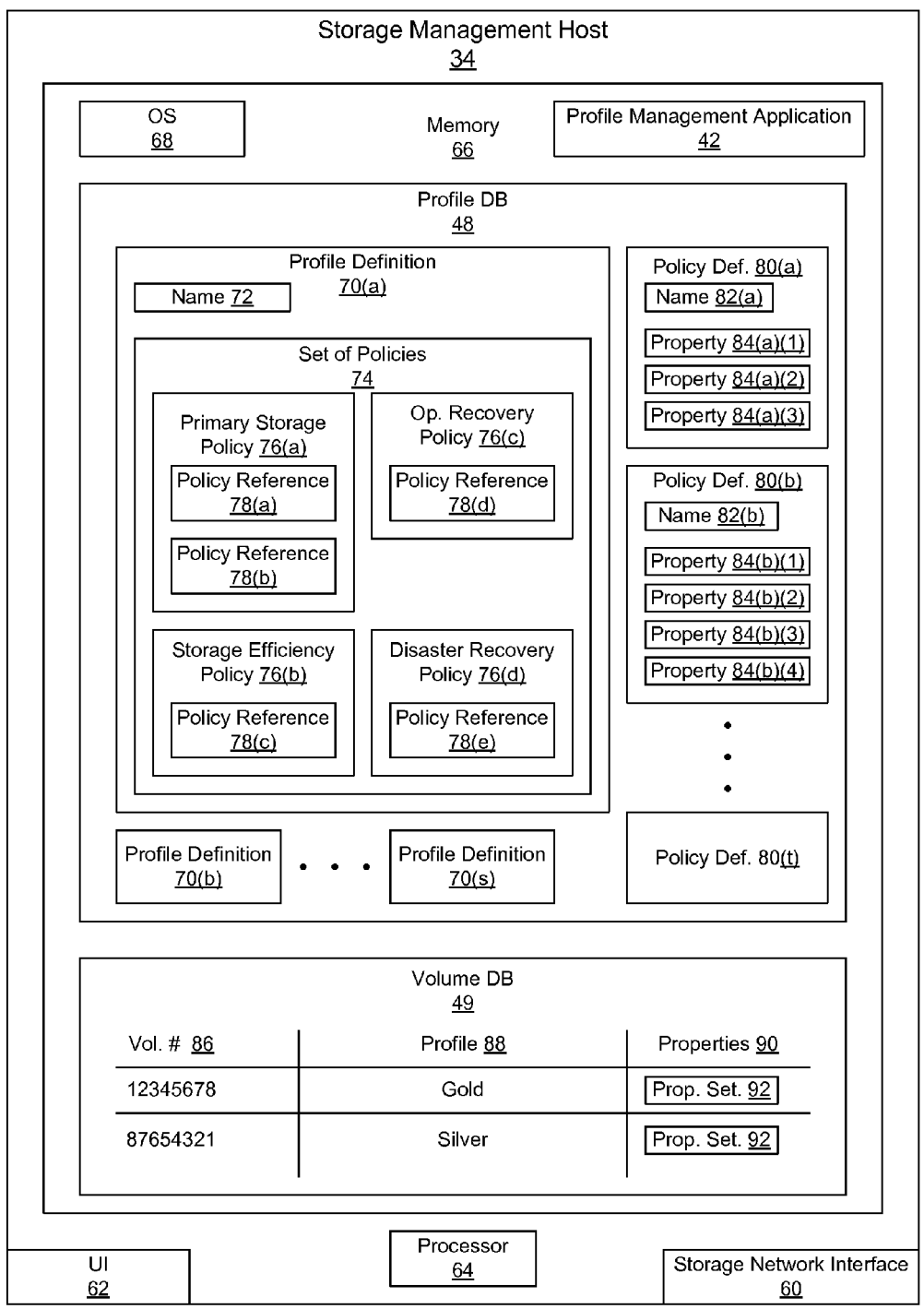
FIG. 2 illustrates an example apparatus according to various embodiments.

FIG. 2 depicts an example storage management host 34 in greater detail. Storage management host 34 includes a storage network interface 60 for interfacing with storage network 32 (e.g., using Ethernet or Fibre Channel), a UI 62 for interfacing with UI devices 44, a processor 64, and memory 66. UI 62 may include one or more serial buses, graphics adapters, etc. for interfacing with UI devices 44. Processor 64 may be, for example, a central processing unit, a microprocessor, a collection of multiple microprocessors, a digital signal processor, a field-programmable gate array, a collection of circuits configured to perform various operations, or another similar device or set of devices configured to perform operations.

Memory 66 may include, for example, system memory, cache memory, volatile memory, random access memory, some combination thereof, or another similar device or set of devices configured to store running software and or data. Memory 66 stores executing and loaded code as well as associated data during execution by the processor 64, including an operating system (OS) 68, drivers (not depicted), and profile management application 42. Profile management application 42 runs on processor 64 and in memory 66, and it allows storage system administrator 46 to interact with profile DB 48 to create and manage storage profiles to be used in connection with creating logical volumes 56, 58 for VM sessions 52. Profile management application 42 also allows storage system administrator 46 to view and interact with volume DB 49.

Profile DB 48 stores a set of storage profile definitions 70. Each profile definition 70 includes a profile name 72 and a set of policies 74. In some embodiments, additional elements may be stored within each profile definition, such as, for example, a profile description. The set of policies 74 includes specific policy types 76. In one embodiment, the set of policy types includes a primary storage policy 76(a) (which defines physical characteristics of the storage drives, such as disk type and RAID configuration), a storage efficiency policy 76(b) (which defines characteristics of the storage that are not physical), an operational recovery policy 76(c) (which defines on-line and local backup procedures), and a disaster recovery policy 76(d) (which defines off-line and remote backup procedures). In some embodiments, primary storage policy 76(a) defines the specific pool 54 that drives are chosen from. Each specific policy type 76 includes a set of policy references 78. Some specific policy types 76 may include one policy reference 78, while other specific policy types 76 may include multiple policy references 78. For example, as depicted, primary storage policy 76(a) includes two policy references 78(a), 78(b). Having two policy references 78 allows virtual environment administrator 51 to exercise a choice between the two policies 78(a), 78(b) when setting up a logical volume 56, 58 for a new VM session 52. It should also be understood that, in some cases, it may be permissible for a specific policy type 76 to include no policy references 78, in which case, that specific policy type 76 is undefined. As depicted, profile DB 48 stores s profile definitions 70(a), 70(b), . . . , 70(s).

Profile DB 48 also stores a set of policy definitions 80. As depicted, profile DB 48 stores t policy definitions 80(a), 80(b), . . . , 80(t). Each policy definition 80 includes a name 82, and a set of policy properties 84. For example, policy definition 80(a) includes three policy properties 84(a)(1), 84(a)(2), and 84(a)(3). For example, policy definition 80(a) may be a primary storage policy definition with name 82(a) "High Performance," a disk type policy 84(a)(1) set to "EFD" (Enterprise Flash Drive, which is a very high speed solid state drive type), a RAID type policy 84(a)(2) set to "RAID 1/0" (RAID level 1/0, which is a very high performance, but also reliable, array configuration setting), and an element size policy set to "Large."

Volume DB 49 stores a table that correlates a volume number 86 with a storage profile name 88 as well as a set of properties 90. For example, volume DB 49, as depicted, shows that volume 12345678 uses a "Gold" storage profile with a property set 92. Property set 92 is included even though the "Gold" storage profile may be defined within the profile DB because it is possible for the profile definition 70 of the "Gold" profile to change after volume 12345678 has been created, but the policies and properties of that volume may not change until an administrator 46, 51 approves such a change.

Having described the various systems, apparatuses, and associated constructs of and used in conjunction with various embodiments, this Description will now turn to describing various method embodiments which may be performed in conjunction with the above-described systems, apparatuses, and associated constructs.

It should be understood that, within this Description, any time a piece of software is described as executing, running, operating, or performing a method, function, step, operation, etc., the method, function, step, or operation is actually performed by an appropriate processor, e.g., 64 while executing code of the software stored in memory, e.g., 66.

Figure 3:
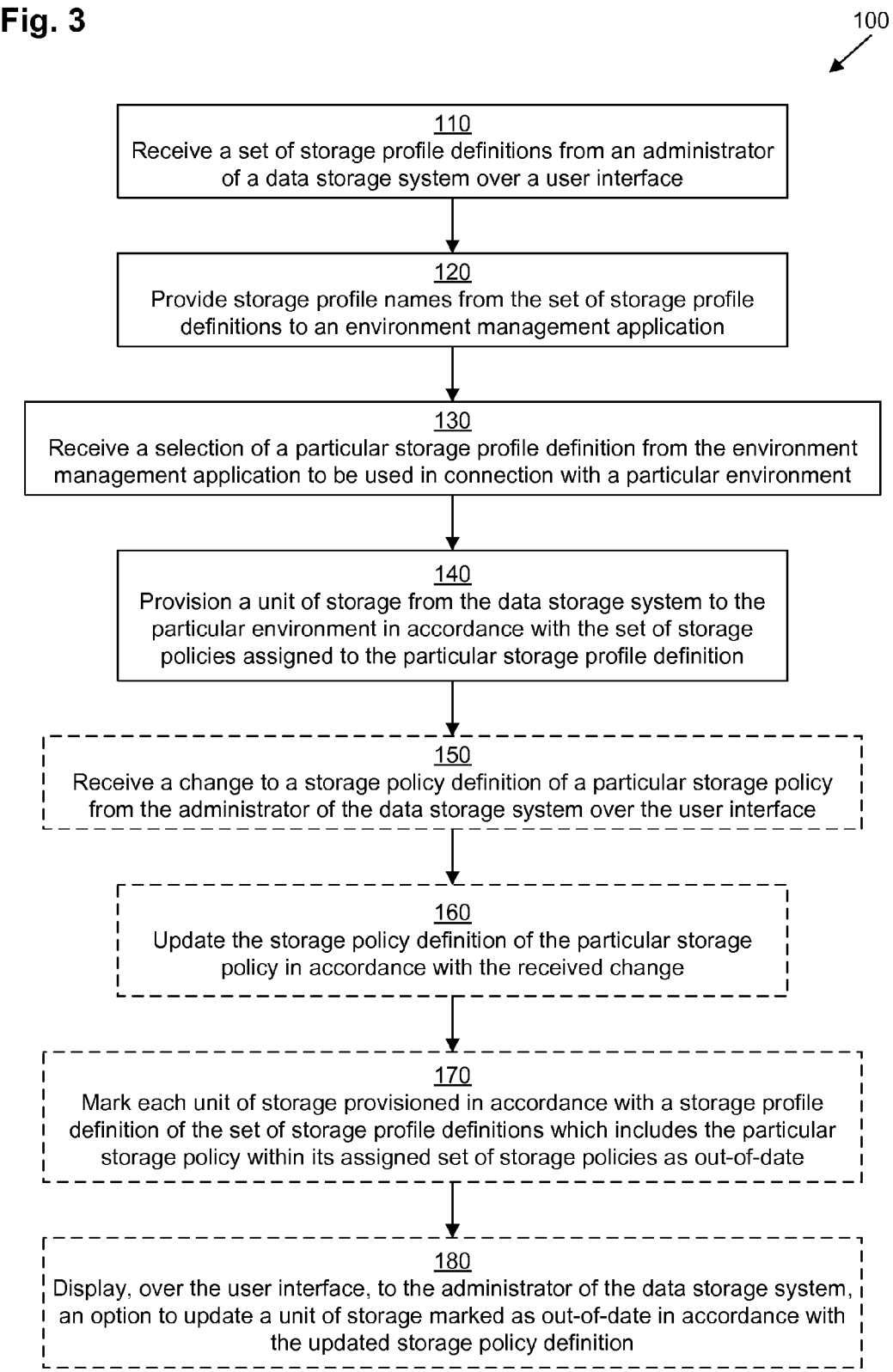
FIG. 3 illustrates an example method according to various embodiments.

FIG. 3 depicts an example method 100 which may be performed by storage management host 34. In particular, method 100 is performed by profile management application 42, executing on storage management host 34.

In step 110, profile management application 42 receives a set of storage profile definitions from storage system administrator 46 over UI 62 via UI devices 44. Upon receiving these, profile management application 42 stores them as storage profile definitions 70 in profile DB 46 of memory 66. In some embodiments, profile management application 42 also receives and stores storage policy definitions 80.

Figure 4:
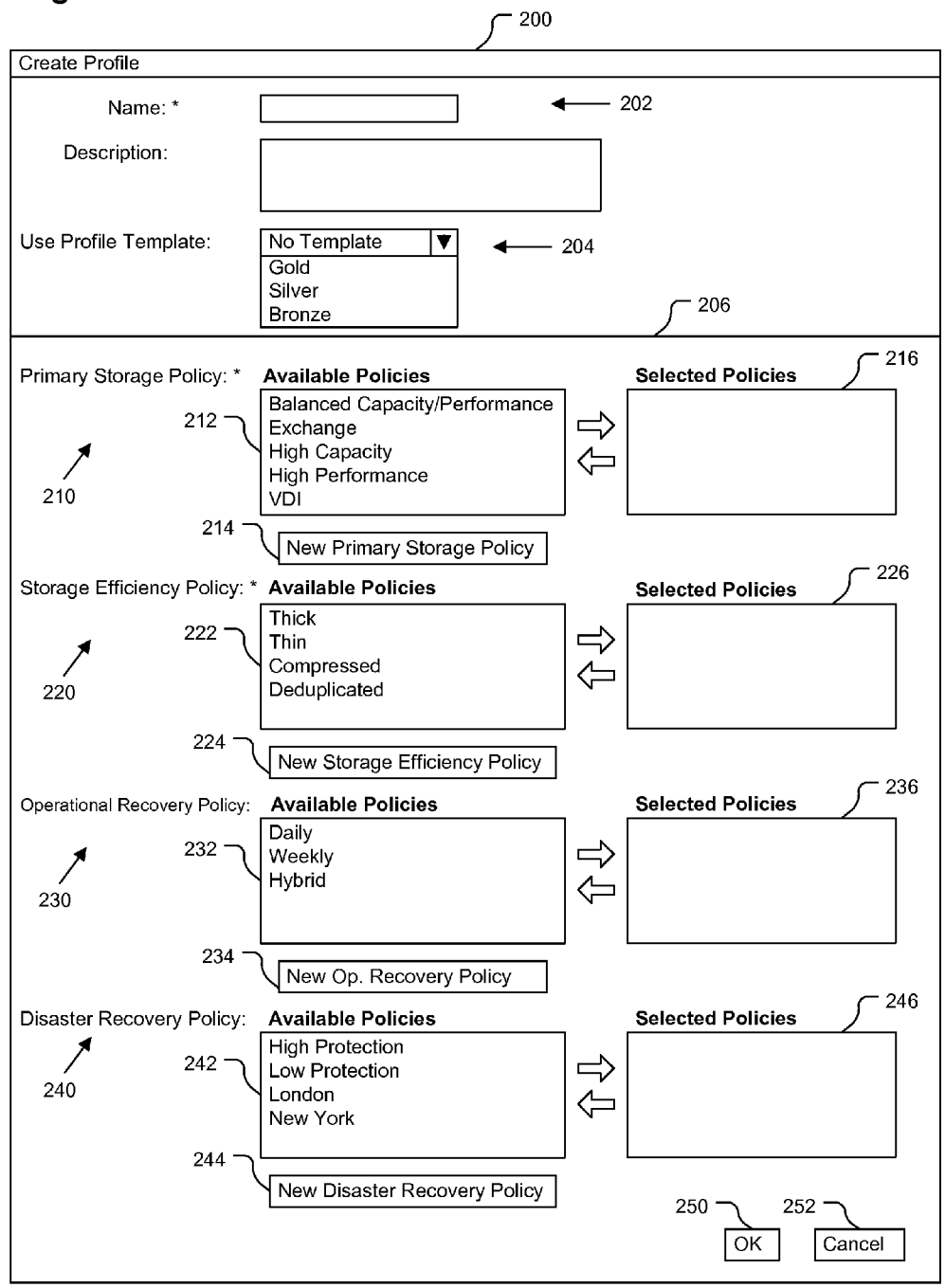
FIG. 4 illustrates an example user interface display for use in practicing various embodiments.
Figure 5:
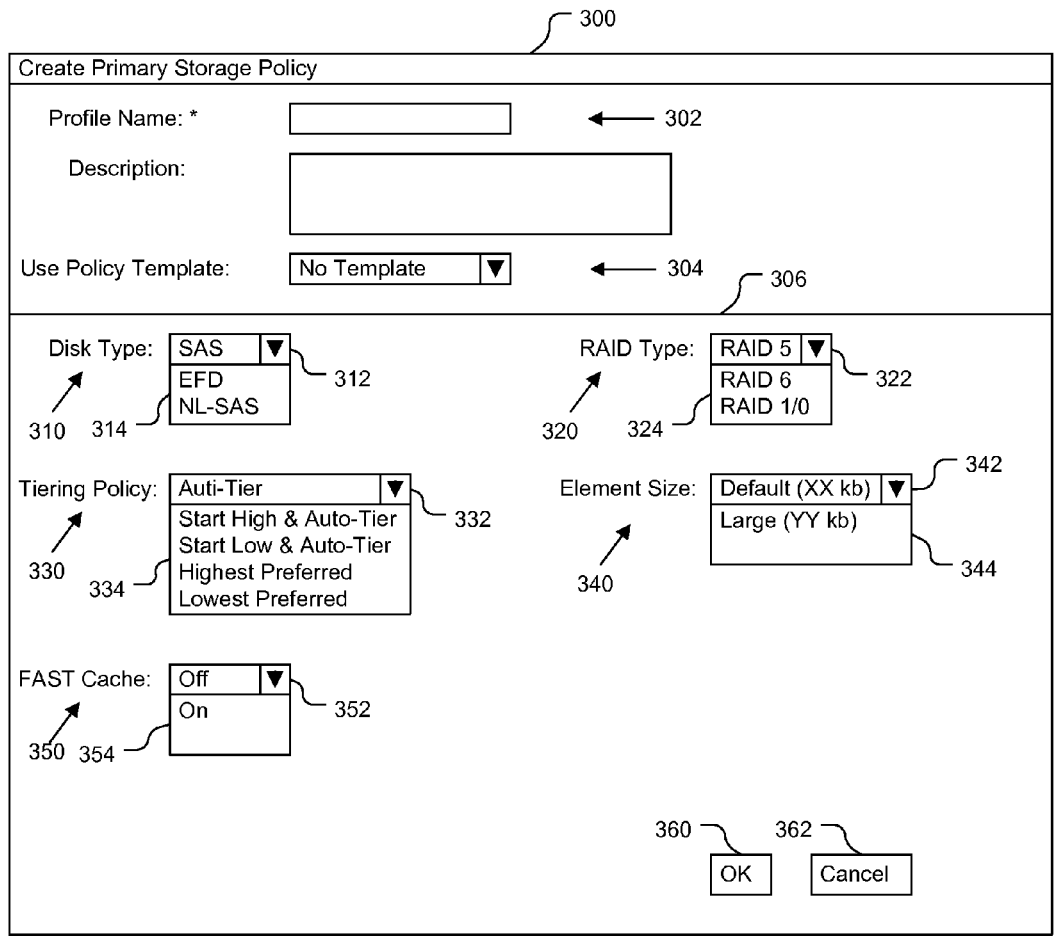
FIG. 5 illustrates an example user interface display for use in practicing various embodiments.

In one example embodiment, profile management application 42 performs step 110 using a graphical user interface (GUI), such as depicted in FIGS. 4-5. FIG. 4 depicts an example storage profile creation page 200, displayed to storage system administrator 46 on a graphical display of UI devices 44 (e.g., a display monitor, a touch sensitive screen, etc.). In some embodiments, profile creation page 200 may be a web page displayed by a web browser, while in other embodiments, profile creation page 200 may be a dialog box displayed as a window of OS 68. Profile creation page 200 includes a name field 202, in which storage system administrator 46 may enter, using a UI device 44 (e.g., a keyboard, keypad, or a mouse, touch-sensitive screen, and/or stylus running a software keyboard), a name for a new profile to be stored as a name 72 within a profile definition 70(x). In some embodiments, additional fields may also be used to allow for input of various optional information. For example, template field 204 may be used to select a storage profile template, which allows default storage policies to be pre-selected, subject to change by the storage system administrator 46.

Profile creation page 200 also includes a policy selection portion 206. Policy selection portion 206 allows storage system administrator 46 to select specific policy definitions for each of a set of storage policy types 210, 220, 230, 240. For example, with respect to primary storage policy 210, a selection box 212 lists the names 82 of available (pre-defined) primary storage policies. Storage system administrator 46 may select one or more of the names 82 in selection box 212 to select one or more policies as the primary storage policy 210. The names 82 of the selected policies then appear in selected box 216. When storage system administrator 46 pushes the OK button 250, a reference 78 (or references) to the selected policy definition 80 is stored within profile DB 48 as the primary storage policy 76(a) of a new profile definition 70(x) having the name 72 as typed into name field 202. Similarly, selection boxes 222, 232, 242 and selected boxes 226, 236, 246 have similar functionality with respect to storage efficiency policy 220, operational recovery policy 230, and disaster recovery policy 240, respectively. If storage system administrator 46 selects a template from template field 204, then the selected boxes 216, 226, 236, 246 may be pre-populated with default policies associated with the selected template.

Profile creation page also includes a cancel button 252 (to allow cancellation of the profile creation process) and a set of policy creation buttons 214, 224, 234, 244, which may be used to create new storage policy definitions 80. For example, if the storage system administrator 46 pushes primary storage policy creation button 214, a primary storage policy creation page is displayed to storage system administrator 46 on a graphical display of UI devices 44 (e.g., a display monitor, a touch sensitive screen, etc.). In some embodiments, policy creation page may be a web page displayed by a web browser, while in other embodiments, policy creation page may be a dialog box displayed as a window of OS 68.

An example primary storage policy creation page 300 is depicted in FIG. 5. Policy creation page 300 includes a name field 302, in which storage system administrator 46 may enter, using a UI device 44 (e.g., a keyboard, keypad, or a mouse, touch-sensitive screen, and/or stylus running a software keyboard), a name for a new policy to be stored as a name 82 within a policy definition 80(y). In some embodiments, additional fields may also be used to allow for input of various optional information. For example, template field 304 may be used to select a storage policy template, which allows default properties to be pre-selected, subject to change by the storage system administrator 46.

Policy creation page 300 also includes a property selection portion 306. Property selection portion 306 allows storage system administrator 46 to select specific properties for each of a set of property types 310, 320, 330, 340, 350. For example, with respect to a disk type property 310, a selection box lists a currently-selected property 312 as well as additional properties 314 that may be chosen instead. For example, as depicted, the SAS property (meaning that policy 70(y) is configured to utilize SAS drives) is the selected property 314, while unselected properties 314 include EFD (for which enterprise flash drives would be used) and NL-SAS (for which NL-SAS drives would be used). Similarly, selection boxes for the other properties—RAID type 320, tiering policy 330, element size 340, and FAST cache 350—may be present on property selection portion 306 with respective currently-selected properties 322, 332, 342, 352, as well as additional properties 324, 334, 344, 354. If storage system administrator 46 selects a template from template field 304, then the currently-selected properties 312, 322, 332, 342, 352 may be pre-populated with default properties associated with the selected template. Upon storage system administrator 46 pushing OK button 360, the currently-selected properties 312, 322, 332, 342, 352 are stored within profile DB 48 as the properties 84(y)(1)-84(y)(5) of a new policy definition 80(y) having the name 82 as typed into name field 302. Policy creation page 300 also includes a cancel button 362 (to allow cancellation of the policy creation process)

Returning to FIG. 4, if a user chooses a different policy creation button 224, 234, 244, a policy creation page analogous to primary storage policy creation page 300 will be displayed, but having different properties and selections within property selection portion 306. For example, property selection portion for a storage efficiency policy creation page might include the following example properties: provisioning property (allowing storage to be provisioned in a thin or thick manner), a compression property (allowing storage to be compressed or uncompressed), and a de-duplication property (allowing storage to be de-duplicated or not).

Returning to FIG. 3, in step 120, profile management application 42 provides storage profile names 72 from the set of storage profile definitions 70 to virtual environment management application 50. In particular, when virtual environment administrator 51 begins to create a new VM session 52 using virtual environment management application 50, virtual environment management application 50 may present virtual environment administrator 51 with choices regarding what type of storage the new VM session 52 should use. Virtual environment management application 50 will receive a list advertised by profile management application 42 having the storage profile names 72 from the set of available storage profile definitions 70. In some embodiments, profile management application 42 advertises this list every time a new profile is created, while, in other embodiments, profile management application 42 advertises the list upon being queried by the virtual environment management application 50. Typically, the details of each storage policy definition 80 are hidden from the VM management application 50, only the profile names 72 being sent. Thus, the properties 84 are hidden. In some embodiments, if multiple policy references 78 are stored within a particular storage policy type 76, then the names 82 of the multiple policy references 78 are also sent with the advertisement, so that the virtual environment administrator 51 can select between them upon choosing a profile that is advertised together with names 82 of multiple policy references 78. In some cases, virtual environment administrator 51 may also be able to select a size for storage in addition to choosing a profile.

In step 130, profile management application 42 receives a selection of a particular storage profile definition 70(x) from the virtual environment management application 50 to be used in connection with a particular VM session 52. Typically, profile management application 42 receives this selection in the form of a profile name 72. In some cases, profile management application 42 may also receive a name 82 of a particular policy reference 78 from virtual environment management application 50 in connection with a profile that has multiple policy references 78 within a particular storage policy type 76.

In step 140, profile management application 42 (or, in some embodiments, a separate storage management application in communication with profile management application 42 running on storage management host 34) provisions a unit of storage 56, 58 from the data storage system to the particular VM session 52 in accordance with the set of storage policies 74 assigned to the particular storage profile definition 70(x). For example, if virtual environment administrator 51 selects a "Gold" storage profile, having a primary storage policy 210 set to High Performance (e.g., using EFD drives in a RAID 1/0 configuration), a storage efficiency policy 220 set to Thick, an operational recovery policy set to Daily, and a disaster policy set to High Protection, then profile management application 42 will provision a volume 56(z) from high performance pool 54(a) in a thick manner (fully allocating all storage requested in advance), and will direct local backup servers to backup the volume 56(z) daily remote backup servers to use a high degree of off-site disaster protection.

In some embodiments, method 100 may continue with steps 150-180.

In step 150, profile management application 42 receives a change to a storage policy definition 80(y) of a particular storage policy from the storage system administrator 46 over UI 62 via UI devices 44.

In one example embodiment, profile management application 42 performs step 150 using a GUI similar to the GUI depicted in FIG. 5. Instead of the policy creation page 300 depicted in FIG. 5, step 150 utilizes a policy modification page. The policy modification page is very similar to policy creation page 300, but, the policy name 82 shown in name field 302 is not changeable, and the template field 304 is omitted. Thus, the storage system administrator 46 is able to modify the various properties 310, 320, 330, 340, 350 of the storage policy definition 80(y), but he cannot modify the name 82 of the storage policy definition 80(y).

In step 160, profile management application 42 updates the storage policy definition 80(y) of the particular storage policy in the profile DB 48 in accordance with the received change. However, the property set 92 for volumes 56, 58 based on profiles 88 that use the affected policy definition 80(y) are not changed in the volume DB 49 because it may not be desirable to instantly change the properties of all such volumes 56, 58.

In step 170, profile management application 42 marks each volume 56, 58 provisioned in accordance with a storage profile definition 70 of the set of storage profile definitions which includes a reference 78 to the particular affected storage policy definition 80(y) as out-of-date.

In step 180, profile management application 42 displays, over UI 62 via UI devices 44, to the storage system administrator 46, an option to update a unit of storage marked as out-of-date in accordance with the updated storage policy definition 80(y).

Figure 6:
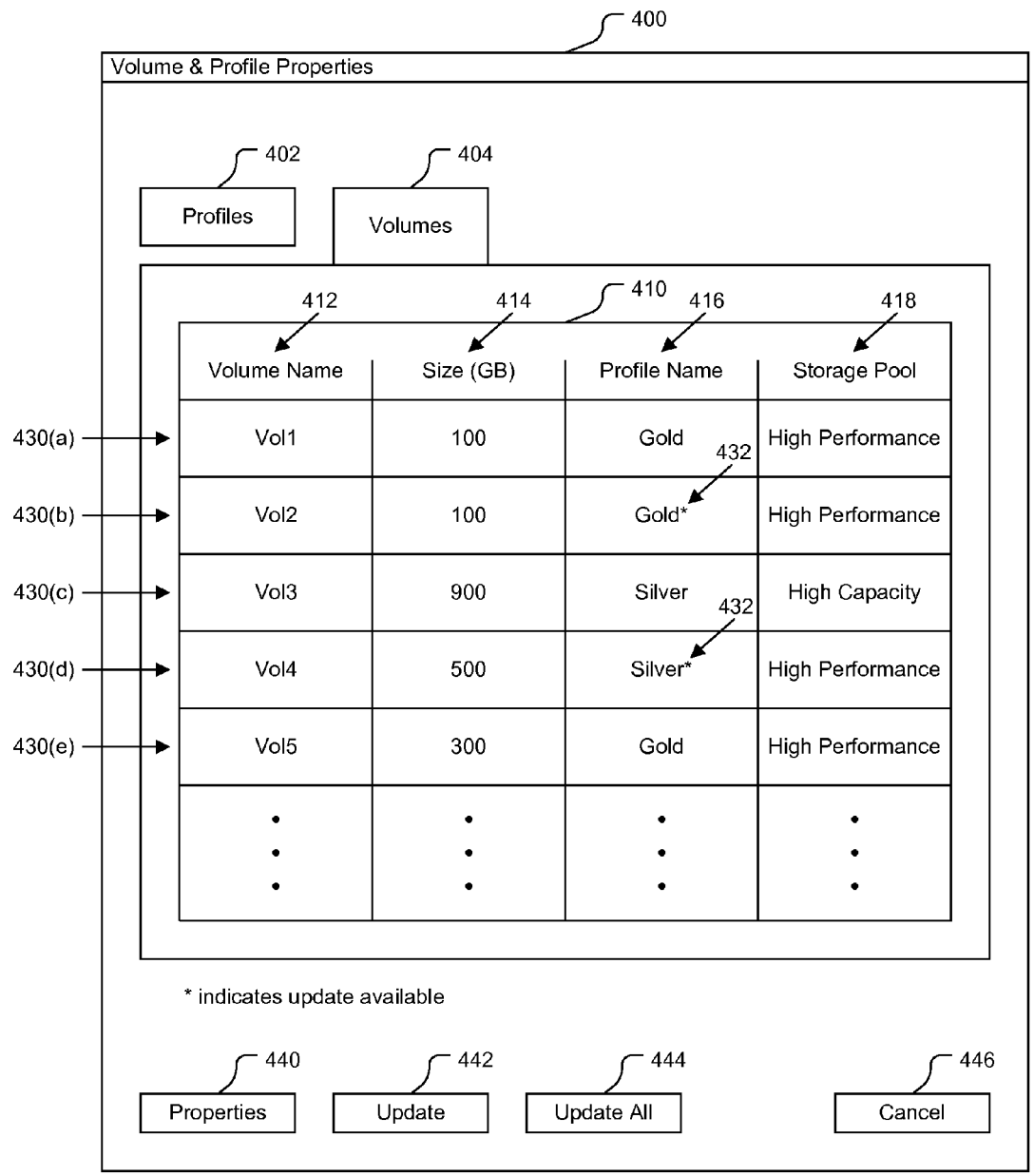
FIG. 6 illustrates an example user interface display for use in practicing various embodiments.
Figure 7:
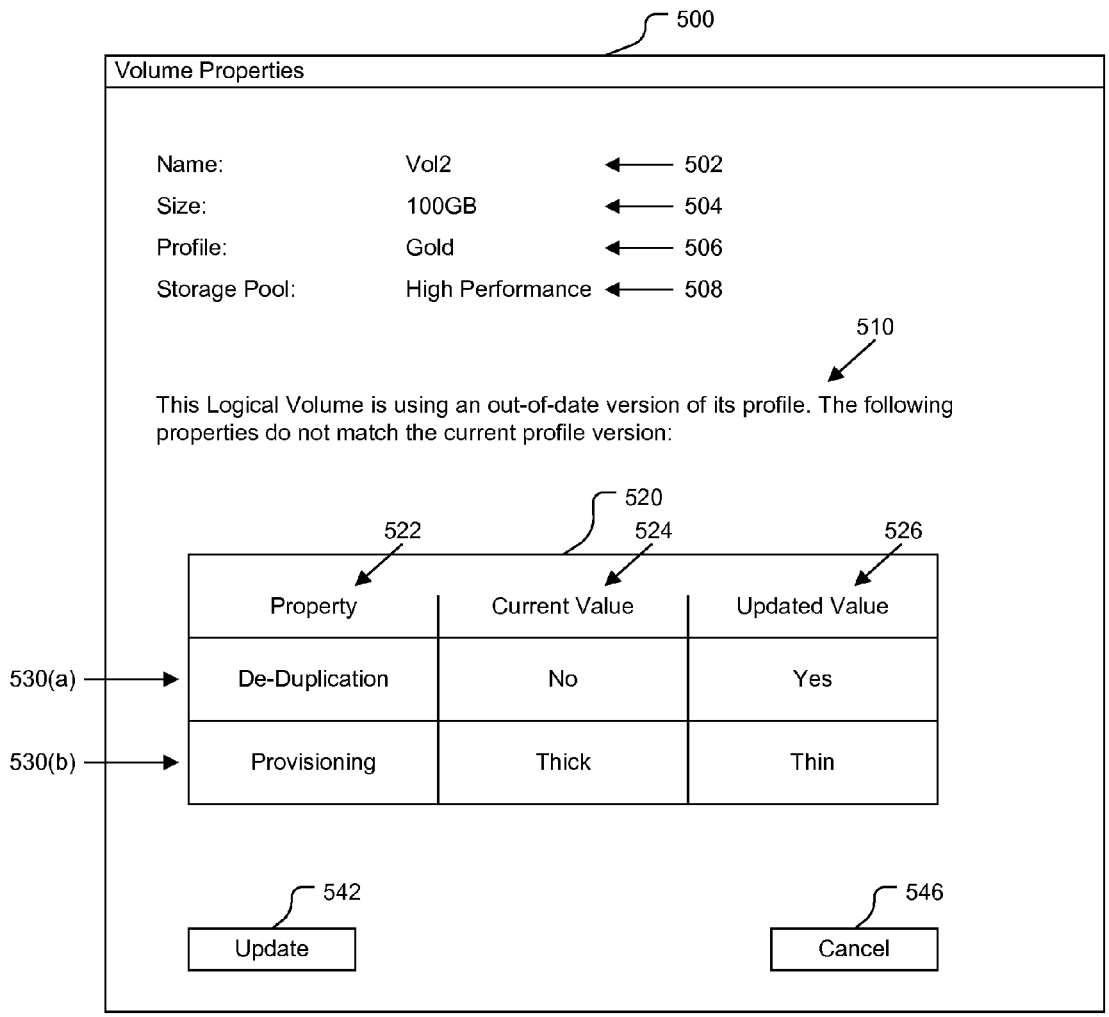
FIG. 7 illustrates an example user interface display for use in practicing various embodiments.

In one example embodiment, profile management application 42 performs steps 170 and 180 using a GUI, such as depicted in FIGS. 6-7. FIG. 6 depicts an example volume and profile summary page 400, displayed to storage system administrator 46 on a graphical display of UI devices 44 (e.g., a display monitor, a touch sensitive screen, etc.). In some embodiments, volume and profile summary page 400 may be a web page displayed by a web browser, while in other embodiments, volume and profile summary page 400 may be a dialog box displayed as a window of OS 68. Volume and profile summary page 400 includes two tabs 402, 404. Profiles tab 402 would display a list of all the profiles defined by the profile definitions 70 in profile DB 48 (not depicted). As depicted, volumes tab 404 is selected, thereby showing a volumes table 410 displaying the currently active logical volumes 56, 58 from the volume DB 49.

Volumes table 410 includes four columns. A volume name column 412 displays the names of all currently active volumes 56, 58. A size column 414 displays the sizes of all of the volumes 56, 58 in GB. A profile name column 416 displays the profile names 72 associated with all of the volumes 56, 58. A storage pool column 418 displays the particular storage pool 54 from which all the volumes are drawn. Each row 430 of the volume table 410 depicts a particular volume 56, 58. Thus, as depicted, five logical volumes, Vol1, Vol2, Vol3, Vol4, and Vol5 are active, three of which, Vol1, Vol2, and Vol5, are based on the Gold profile. The remaining two volumes, Vol3 and Vol4, are based on the Silver profile. However, two of the volumes include an asterisk 432, on rows 430(b) and 430(d), which indicates that Vol2 and Vol4 are based on out-of-date versions of the listed profiles. The storage system administrator 46 may update a particular volume Vol2, Vol4 by selecting the appropriate row 430(b), 430(d) and then clicking on the Update button 442. Alternatively, the storage system administrator 46 may simultaneously update all out-of-date volumes Vol2, Vol4 by clicking on the Update All button 444. Either of these update actions may temporarily render the one or more volumes Vol2, Vol4 inaccessible while they are updated. The storage system administrator 46 may also take no action by clicking on the Cancel button 446.

It can be seen from the volumes table 410 that one reason why Vol4 is out-of-date may be because the primary storage policy 210 has changed—when Vol4 was created, the Silver profile included the High Performance policy as the primary storage policy 210, while the current version of the Silver profile includes the High Capacity policy as the primary storage policy 210. However, it is not immediately obvious how Vol2 is out-of-date—in order to see how it is out-of-date, the storage system administrator 46 may select the volume Vol2 and then click on the Properties button 440. This action will bring up a volume properties page, such as the example volume properties page 500 depicted in FIG. 7.

FIG. 7 depicts an example volume properties page 500, displayed to storage system administrator 46 on a graphical display of UI devices 44 (e.g., a display monitor, a touch sensitive screen, etc.). In some embodiments, volume properties page 500 may be a web page displayed by a web browser, while in other embodiments, volume properties page 500 may be a dialog box displayed as a window of OS 68. Volume properties page 500 displays a name property 502, a size property 504, a profile name 506, and a storage pool property 508 associated with a particular logical volume 56, 58, e.g., Vol2. Volume properties page 500 also displays a warning message 510 that explains that the volume Vol2 is using an out-of-date profile. Properties table 520 displays a list of properties that differ between the storage profile definition 70 and the actual volume Vol2. Properties table 520 includes three columns: a Property column 522 lists the name of a property 84 that has changed; a Current Value column 524 that lists the value of that property 84 in the current volume Vol2; and an Updated Value column 526 that lists the new value for that property from the current storage profile definition 70 (actually, the current storage policy definition 80(y) referred to by the storage profile definition 70). Properties table 520 may include one or more rows 530. As depicted, properties table 520 includes two rows 530(a), 530(b). One row 530(a) indicates that a De-duplication property has been changed within the Gold profile from No to Yes. A second row 530(b) indicates that a Provisioning property has been changed within the Gold profile from Thick to Thin. In should be understood that other properties 84 may also be displayed in properties table 520. In some embodiments, if the storage pool 54 of the profile has changed, that would be indicated in the properties table, such as, for example, with the Property column 522 reading "Storage Pool," the Current Value column 524 reading "High Capacity," and the Updated Value column 526 reading "High Performance."

The storage system administrator 46 may update the volume Vol2 by selecting the clicking on the Update button 542. This update action may temporarily render the volume Vol2 inaccessible while it is updated. The storage system administrator 46 may also take no action by clicking on the Cancel button 546.

Thus, the storage system administrator 46 is able to create custom storage profile definitions 70 having specified policy definitions 80 and properties 84, thereby allowing a virtual environment administrator 51 to select a storage profile name 72 associated with a particular storage policy definition 70(x) for a storage volume 56, 58 to be provisioned for a particular virtual machine session 52 without the virtual environment administrator 51 needing to be concerned about implementation details.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a storage management computer, the method comprising:
   receiving a set of storage profile definitions from an administrator of a data storage system over a user interface, each storage profile definition of the set of storage profile definitions including:
   a storage profile name; and
   a set of storage policies assigned to that storage profile definition;
   providing the storage profile names from the set of storage profile definitions to an environment management application, the environment management application being configured to manage environments that use storage from the data storage system;
   in response to providing, receiving a selection of a particular storage profile definition from the environment management application to be used in connection with a particular environment; and
   provisioning a unit of storage from the data storage system to the particular environment in accordance with the set of storage policies assigned to the particular storage profile definition;
   wherein:
   receiving the set of storage profile definitions includes receiving a storage policy definition for each storage policy of the set of storage policies, each storage policy definition including:
   a storage policy name; and
   a set of storage properties assigned to that storage policy definition, wherein the set of storage properties assigned to that storage policy definition remains hidden from the environment management application;
   each storage policy of the set of storage policies assigned to each storage profile definition belongs to a respective storage property type, each storage property type being associated with particular storage-related features of the data storage system;
   two storage policies of the set of storage policies included within a storage profile definition of the set of storage profile definitions belong to the same storage property type; and
   providing the storage profile names to the environment management application includes providing an indication to the environment management application that selection of the storage profile of the set of storage profiles requires an additional selection of one of the two storage polices belonging to the same storage property type included within the storage profile definition.

2. The method of claim 1 wherein:
   the environments that use storage from the data storage system include virtual machines executing on one or more of a set of server computers; and
   the particular environment is a virtual machine executing on a server computer of the set of server computers.

3. The method of claim 1 wherein provisioning the unit of storage from the data storage system to the particular environment in accordance with the set of storage policies assigned to the particular storage profile definition includes provisioning a single logical volume within the data storage system, the single logical volume having the set of storage policies throughout.

4. A method performed by a storage management computer, the method comprising:
   receiving a set of storage profile definitions from an administrator of a data storage system over a user interface, each storage profile definition of the set of storage profile definitions including:
   a storage profile name; and
   a set of storage policies assigned to that storage profile definition;
   providing the storage profile names from the set of storage profile definitions to an environment management application, the environment management application being configured to manage environments that use storage from the data storage system;
   in response to providing, receiving a selection of a particular storage profile definition from the environment management application to be used in connection with a particular environment; and provisioning a unit of storage from the data storage system to the particular environment in accordance with the set of storage policies assigned to the particular storage profile definition;

wherein:

receiving the set of storage profile definitions includes receiving a storage policy definition for each storage policy of the set of storage policies, each storage policy definition including:

a storage policy name; and a set of storage properties assigned to that storage policy definition, wherein the set of storage properties assigned to that storage policy definition remains hidden from the environment management application; and the method further includes:

receiving a change to a storage policy definition of a particular storage policy from the administrator of the data storage system over the user interface;

updating the storage policy definition of the particular storage policy in accordance with the received change;

marking each unit of storage provisioned in accordance with a storage profile definition of the set of storage profile definitions which includes the particular storage policy within its assigned set of storage policies as out-of-date; and displaying, over the user interface, to the administrator of the data storage system, an option to update a unit of storage marked as out-of-date in accordance with the updated storage policy definition.

5. The method of claim 4 wherein:

the environments that use storage from the data storage system include virtual machines executing on one or more of a set of server computers; and the particular environment is a virtual machine executing on a server computer of the set of server computers.

6. The method of claim 4 wherein provisioning the unit of storage from the data storage system to the particular environment in accordance with the set of storage policies assigned to the particular storage profile definition includes provisioning a single logical volume within the data storage system, the single logical volume having the set of storage policies throughout.

7. An apparatus comprising:

a user interface;

a storage network interface connected to a data storage system over a storage network;

memory; and a processor, the processor being configured to perform the operations of:

receiving a set of storage profile definitions from an administrator of the data storage system over the user interface, each storage profile definition of the set of storage profile definitions including:

a storage profile name; and a set of storage policies assigned to that storage profile definition;

storing the received set of storage profile definitions in memory;

providing the storage profile names from the set of storage profile definitions to an environment management application, the environment management application being configured to manage environments that use storage from the data storage system;

in response to providing, receiving a selection of a particular storage profile definition from the environment management application to be used in connection with a particular environment; and provisioning a unit of storage from the data storage system to the particular environment in accordance with the set of storage policies assigned to the particular storage profile definition;

wherein:

the processor is configured to, when receiving the set of storage profile definitions, perform the operation of receiving a storage policy definition for each storage policy of the set of storage policies, each storage policy definition including:

a storage policy name; and a set of storage properties assigned to that storage policy definition, wherein the set of storage properties assigned to that storage policy definition remains hidden from the environment management application;

each storage policy of the set of storage policies assigned to each storage profile definition belongs to a respective storage property type, each storage property type being associated with particular storage-related features of the data storage system;

two storage policies of the set of storage policies included within a storage profile definition of the set of storage profile definitions belong to the same storage property type; and the processor is configured to, when providing the storage profile names to the environment management application, perform the operation of providing an indication to the environment management application that selection of the storage profile of the set of storage profiles requires an additional selection of one of the two storage polices belonging to the same storage property type included within the storage profile definition.

8. The apparatus of claim 7 wherein:

the environments that use storage from the data storage system include virtual machines executing on one or more of a set of server computers; and the particular environment is a virtual machine executing on a server computer of the set of server computers.

9. The apparatus of claim 7 wherein provisioning the unit of storage from the data storage system to the particular environment in accordance with the set of storage policies assigned to the particular storage profile definition includes provisioning a single logical volume within the data storage system, the single logical volume having the set of storage policies throughout.

10. An apparatus comprising:

a user interface;

a storage network interface connected to a data storage system over a storage network;

memory; and a processor, the processor being configured to perform the operations of:

receiving a set of storage profile definitions from an administrator of the data storage system over the user interface, each storage profile definition of the set of storage profile definitions including:

a storage profile name; and a set of storage policies assigned to that storage profile definition;

storing the received set of storage profile definitions in memory;

providing the storage profile names from the set of storage profile definitions to an environment management application, the environment management application being configured to manage environments that use storage from the data storage system;

in response to providing, receiving a selection of a particular storage profile definition from the environment management application to be used in connection with a particular environment; and provisioning a unit of storage from the data storage system to the particular environment in accordance with the set of storage policies assigned to the particular storage profile definition;

wherein:

the processor is configured to, when receiving the set of storage profile definitions, perform the operation of receiving a storage policy definition for each storage policy of the set of storage policies, each storage policy definition including:

a storage policy name; and a set of storage properties assigned to that storage policy definition, wherein the set of storage properties assigned to that storage policy definition remains hidden from the environment management application; and the processor is further configured to perform the operations of:

receiving a change to a storage policy definition of a particular storage policy from the administrator of the data storage system over the user interface;

updating the storage policy definition of the particular storage policy stored in memory in accordance with the received change;

marking each unit of storage provisioned in accordance with a storage profile definition of the set of storage profile definitions which includes the particular storage policy within its assigned set of storage policies as out-of-date; and displaying, over the user interface, to the administrator of the data storage system, an option to update a unit of storage marked as out-of-date in accordance with the updated storage policy definition.

11. The apparatus of claim 10 wherein:

the environments that use storage from the data storage system include virtual machines executing on one or more of a set of server computers; and the particular environment is a virtual machine executing on a server computer of the set of server computers.

12. The apparatus of claim 10 wherein provisioning the unit of storage from the data storage system to the particular environment in accordance with the set of storage policies assigned to the particular storage profile definition includes provisioning a single logical volume within the data storage system, the single logical volume having the set of storage policies throughout.

13. A computer program product comprising a tangible non-transitory computer-readable medium storing instructions, which when performed by a computer, cause the computer to perform the operations of:

receiving a set of storage profile definitions from an administrator of a data storage system over a user interface, each storage profile definition of the set of storage profile definitions including:

a storage profile name; and a set of storage policies assigned to that storage profile definition;

providing the storage profile names from the set of storage profile definitions to an environment management application, the environment management application being configured to manage environments that use storage from the data storage system;

in response to providing, receiving a selection of a particular storage profile definition from the environment management application to be used in connection with a particular environment; and provisioning a unit of storage from the data storage system to the particular environment in accordance with the set of storage policies assigned to the particular storage profile definition;

wherein:

the instructions cause the computer to, when receiving the set of storage profile definitions, perform the operation of receiving a storage policy definition for each storage policy of the set of storage policies, each storage policy definition including:

a storage policy name; and a set of storage properties assigned to that storage policy definition, wherein the set of storage properties assigned to that storage policy definition remains hidden from the environment management application;

each storage policy of the set of storage policies assigned to each storage profile definition belongs to a respective storage property type, each storage property type being associated with particular storage-related features of the data storage system;

two storage policies of the set of storage policies included within a storage profile definition of the set of storage profile definitions belong to the same storage property type; and the instructions cause the computer to, when providing the storage profile names to the environment management application, perform the operation of providing an indication to the environment management application that selection of the storage profile of the set of storage profiles requires an additional selection of one of the two storage polices belonging to the same storage property type included within the storage profile definition.

14. The computer program product of claim 13 wherein:

the environments that use storage from the data storage system include virtual machines executing on one or more of a set of server computers; and the particular environment is a virtual machine executing on a server computer of the set of server computers.

15. The computer program product of claim 13 wherein provisioning the unit of storage from the data storage system to the particular environment in accordance with the set of storage policies assigned to the particular storage profile definition includes provisioning a single logical volume within the data storage system, the single logical volume having the set of storage policies throughout.

16. A computer program product comprising a tangible non-transitory computer-readable medium storing instructions, which when performed by a computer, cause the computer to perform the operations of:

receiving a set of storage profile definitions from an administrator of a data storage system over a user interface, each storage profile definition of the set of storage profile definitions including:

a storage profile name; and a set of storage policies assigned to that storage profile definition;

providing the storage profile names from the set of storage profile definitions to an environment management application, the environment management application being configured to manage environments that use storage from the data storage system;

in response to providing, receiving a selection of a particular storage profile definition from the environment management application to be used in connection with a particular environment; and provisioning a unit of storage from the data storage system to the particular environment in accordance with the set of storage policies assigned to the particular storage profile definition;

wherein:

the instructions cause the computer to, when receiving the set of storage profile definitions, perform the operation of receiving a storage policy definition for each storage policy of the set of storage policies, each storage policy definition including:

a storage policy name; and a set of storage properties assigned to that storage policy definition, wherein the set of storage properties assigned to that storage policy definition remains hidden from the environment management application; and the instructions, when performed by the computer, further cause the computer to perform the operations of:

receiving a change to a storage policy definition of a particular storage policy from the administrator of the data storage system over the user interface;

updating the storage policy definition of the particular storage policy in accordance with the received change;

marking each unit of storage provisioned in accordance with a storage profile definition of the set of storage profile definitions which includes the particular storage policy within its assigned set of storage policies as out-of-date; and displaying, over the user interface, to the administrator of the data storage system, an option to update a unit of storage marked as out-of-date in accordance with the updated storage policy definition.

17. The computer program product of claim 16 wherein:

the environments that use storage from the data storage system include virtual machines executing on one or more of a set of server computers; and the particular environment is a virtual machine executing on a server computer of the set of server computers.

18. The computer program product of claim 16 wherein provisioning the unit of storage from the data storage system to the particular environment in accordance with the set of storage policies assigned to the particular storage profile definition includes provisioning a single logical volume within the data storage system, the single logical volume having the set of storage policies throughout.

\* \* \* \* \*